United States Patent
Yang

(10) Patent No.: US 11,790,340 B2
(45) Date of Patent: Oct. 17, 2023

(54) WASTE RECYCLING SYSTEM WITH AN AUTOMATIC DUMPSTER

(71) Applicant: Chen Yang, Taoyuan (TW)

(72) Inventor: Chen Yang, Taoyuan (TW)

(73) Assignee: Hao-Yang Environment Science Ltd., Taoyuan (TW)

( * ) Notice: Subject to any disclaimer, the term of this patent is extended or adjusted under 35 U.S.C. 154(b) by 424 days.

(21) Appl. No.: 16/989,008

(22) Filed: Aug. 10, 2020

(65) Prior Publication Data

US 2021/0049571 A1 Feb. 18, 2021

(30) Foreign Application Priority Data

Aug. 13, 2019 (TW) .................. 108128667

(51) Int. Cl.
*G06Q 20/18* (2012.01)
*G06K 19/07* (2006.01)
*G06Q 10/30* (2023.01)

(52) U.S. Cl.
CPC ......... *G06Q 20/18* (2013.01); *G06K 19/0723* (2013.01); *G06Q 10/30* (2013.01); *Y02W 30/50* (2015.05)

(58) Field of Classification Search
CPC .... G06Q 20/18; G06Q 10/30; G06K 19/0723; Y02W 30/50
USPC ...................................................... 232/43.3
See application file for complete search history.

(56) References Cited

U.S. PATENT DOCUMENTS

| 2008/0140253 A1* | 6/2008 | Brown | .................. | B65F 1/1638 701/23 |
| 2018/0068088 A1* | 3/2018 | Webb | ..................... | G06Q 20/34 |

FOREIGN PATENT DOCUMENTS

| AT | 516591 A1 | * | 6/2016 |
| JP | 6487202 | | 3/2019 |
| KR | 101412527 B1 | * | 6/2014 |
| TW | M351860 | | 3/2009 |
| TW | 201616420 | | 5/2016 |
| TW | 201713583 A | * | 4/2017 |
| TW | I622006 | | 4/2018 |

\* cited by examiner

*Primary Examiner* — Thien M Le
*Assistant Examiner* — Tae W Kim
(74) *Attorney, Agent, or Firm* — James W. Huffman; Huffman Law Group, PC

(57) ABSTRACT

A waste recycling system with an automated dumpster includes a main body and the main body includes a main control module. The main control module includes a main control unit, and is electrically connected to a dumpster module. The dumpster module includes a dumpster and the dumpster includes a sub-control module. The sub-control module includes a sub-control unit. The sub-control unit is electrically connected to a power unit and a scanning unit. The power unit is used to drive the dumpster and the scanning unit is disposed at the front end of the dumpster to receive signals. The sub-control unit also includes guiding units. The guiding unit is disposed on the transporting path of the dumpster. By the scanning unit, the scanned signal is transmitted back to the sub-control unit to control the dumpster moving automatically.

12 Claims, 5 Drawing Sheets

WASTE RECYCLING SYSTEM WITH AN AUTOMATIC DUMPSTER

BACKGROUND OF THE INVENTION

1. Field of the Invention

The present invention is related to a waste removing and transporting apparatus, and more particularly related to a waste recycling system with a dumpster having an automatic schedule for transportation.

2. Description of Related Art

At present, in order to improve the transporting efficiency for garbage or waste, and implement the principle of user charge, more and more communities or designated sites set up large-scale waste recycling systems. Through the construction of the certain systems, waste transportation can be effectively managed so as to reduce manpower management and costs. The time of garbage removal can be effectively reduced and the impact of traffic for the passengers and vehicles can also be decreased.

The present recycling system, through the system's control, can provide a payment mechanism, and also include air conditioning and compression equipment inside the recycling system. Therefore, under the long-term accumulation and storage of garbage, the temperature of the storage space is reduced by the air conditioning equipment to avoid wastes produce sewage and stench due to fermentation, which would cause secondary pollution to the environment. In addition, through the compression equipment, the utilization rate of the recycling space is increased.

Although the conventional recycling system can greatly reduce the cost of waste disposal through the construction of the system, the dumpsters installed in the system are still moved by manpower every a period of time in the end. The dumpsters are pushed to the removal truck after moving away from the site, the automation design of this recycling system was wasted, which became a shortcoming in the system.

SUMMARY OF THE INVENTION

An objection of the present invention is to provide a waste recycling system with automated dumpster. By the design of the system schedule, the dumpster can be automatically driven to a predetermined position before a predetermined time by the automatic control of the system for the subsequent cleaning action.

According to the aforementioned objection, a waste recycling system with an automated dumpster is provided and includes:
  a main body including:
    an opening disposed at a first side of the main body;
    a movable door panel disposed at a position corresponding to the opening; and used to cover the opening; and
    an input port disposed at a second side of the main body;
  a main control module disposed within the main body and used to control all functions of the recycling system, and the main control module further including:
    a main control unit used to send or receive commands and feedbacks of all control functions;
    an input unit electrically connected to the main control unit and disposed at the second side of the main body to display system-related information, and is operated by touch action and transmits input-related information to the main control unit;
    a payment flow unit electrically connected to the main control unit, and the payment flow unit disposed on the second side of the main body and adjacent to the input unit;
    a weighing unit electrically connected to the main control unit for weighing weight of recycling materials and transmitting weighting information to the main control unit, and the weighing unit disposed at the second side of the main body, and a position of the weighting unit corresponding to the opening of the main body; and
    a wireless receiving unit electrically connected to the main control unit for sending and receiving wireless signals so as to return the wireless signal to the main control unit; and
  a dumpster module electrically connected to the main control module, and including:
    a dumpster having a plurality of rollers disposed at the bottom of the dumpster, accommodated inside the main body and close to the input port; and
    a sub-control module disposed on the dumpster and including:
    a sub-control unit, which is a function control center of the dumpster module, used to transmit or receive control commands and feedback of the dumpster module and electrically connected to the main control unit;
    a power unit electrically connected to the sub-control unit, and used to connect the plurality of rollers to provide power to drive the plurality of rollers to rotate;
    a scanning unit electrically connected to the sub-control unit and disposed at a front end of the dumpster, and used for receiving signals and transmitting to the sub-control unit;
    a sub-wireless unit electrically connected to the sub-control unit to send and receive the wireless signals cooperated with the main control unit to receive control commands; and
    a plurality of guiding units disposed on a transporting path of the dumpster, wherein the scanning unit on the dumpster is scanning and reporting scanned signal to the sub-control unit to control the dumpster operating automatically.

The features and advantages of the present invention are detailed hereinafter with reference to the preferred embodiments. The detailed description is intended to enable a person skilled in the art to gain insight into the technical contents disclosed herein and implement the present invention accordingly. In particular, a person skilled in the art can easily understand the objects and advantages of the present invention by referring to the disclosure of the specification, the claims, and the accompanying drawings.

BRIEF DESCRIPTION OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE PREFERRED EMBODIMENT

These and other aspects of the embodiments herein will be better appreciated and understood when considered in conjunction with the following description and the accompanying drawings.

Figure 1:
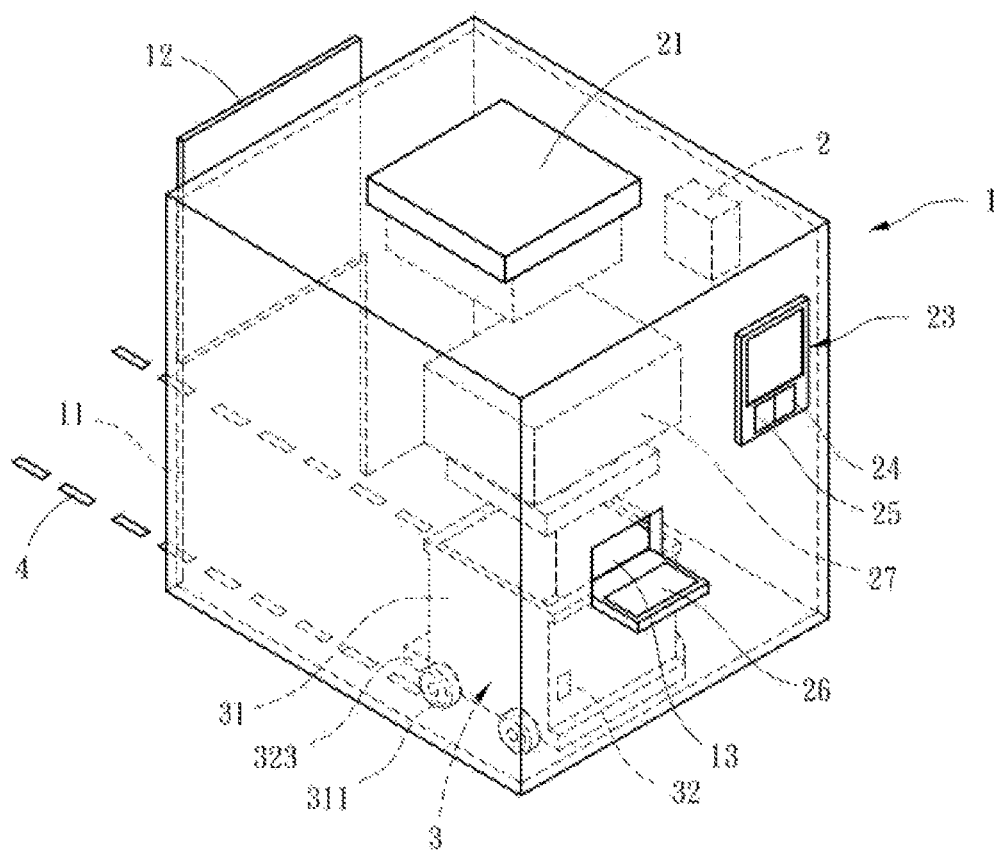
FIG. 1 is a structural diagram of a system in the present invention.

Please referring to FIG. 1, and it is a system structure diagram in the present invention. As shown in the drawing, the recycling system in the present invention includes a main body 1, a main control module 2 and a dumpster module 3. The main body 1 in the present embodiment has a hollow rectangular body, and includes an opening 11 and a movable door panel 12. The opening 11 is provided at a first side of the main body 1. The movable door panel 12 is installed at a position corresponding to the opening 11 and is used to shield the opening 11 to maintain the sealed state of the main body 1.

Figure 2:
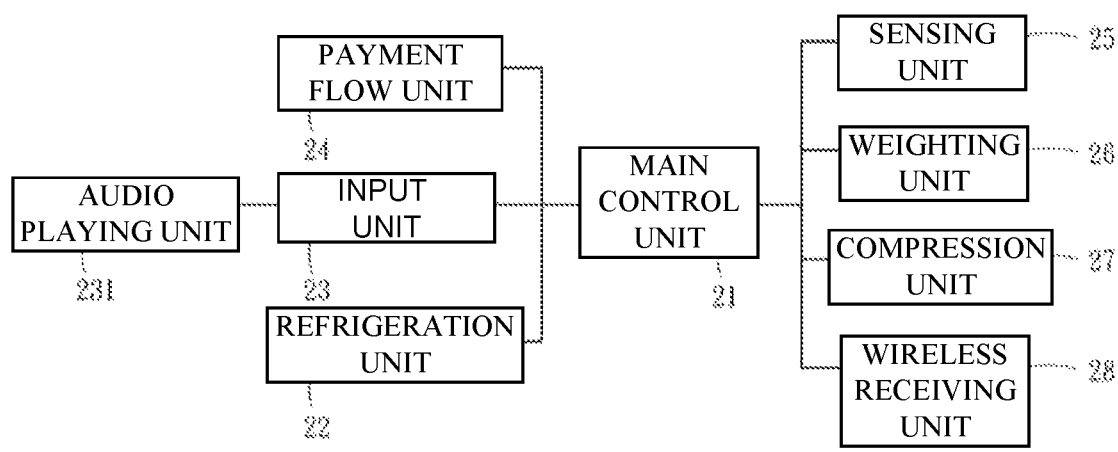
FIG. 2 is system block diagram of a main control module in the present invention.

Please referring to FIG. 2, and it is a system block diagram of the main control module in the present invention. As shown in FIG. 2, the main control module 2 is disposed within the main body 1 and is configured to control all functions of the recycling system. The main control module 2 includes a main control unit 21, a refrigeration unit 22, an input unit 23, a payment flow unit 24, a sensing unit 25, a weighting unit 26, a compressing unit 27 and a wireless receiving unit 28. The main control unit 21 is a control computer for transmitting or receiving commands and feedback of all control functions. The main control unit 21 is electrically connected to the refrigeration unit 22, and the refrigeration unit 22 is a kind of refrigeration device in the present embodiment. The refrigeration unit 22 is disposed on the top of the main body 1 to reduce the temperature inside the main body 1. The main control unit 21 is electrically connected to the input unit 23, and the input unit 23 in the present embodiment is a display control panel. The input unit 23 is disposed at a second side of the main body 1. In the present embodiment, the input unit 23 and the opening 11 are located opposite to each other. The input unit 23 is used to display the system-related information, so that the user can operate through touch action, and the input related information is transmitted to the main control unit 21 to facilitate subsequent operation programs. The main control unit 21 is electrically connected to the payment flow unit 24, and the payment flow unit 24 is disposed at the second side of the main body 1 and is adjacent to the input unit 23. The payment flow unit 24 in the present embodiment is a scanning device that can accept any kinds of payment machines to perform money charging. In addition, the payment flow unit 24 can also be a coin machine, but it is not limited herein. Moreover, the input unit 23 is provided with an audio playing unit 231. The audio playing unit 231 is used to play the displayed relevant audio description or prompt sound, so that the user can understand the current operation procedure or result through the sound.

Still referring to FIG. 1 and FIG. 2, the main control unit 21 is electrically connected to the sensing unit 25, and the sensing unit 25 is used to identify the identity of the user to confirm whether the user has the permission or record to use the system. The main control unit 21 is electrically connected to the weighting unit 26. The weighting unit 26 in this embodiment is an electronic scale for weighing the weight of garbage, and transmits the weighting to the main control unit 21 for subsequent billing procedures. The weighting unit 26 is located on the second side of the main body 1 and is at the same side as the input unit 23. The position of the weighing unit 26 corresponds to one of the input ports 13 of the main body 1. The weighing unit 26 in the present embodiment is in a shape of a flat plate and can be folded, so that the weighing unit 26 can seal the input port 13 when the weighting unit 26 is not in use. The main control unit 21 is electrically connected to the compressing unit 27. The compressing unit 27 is located inside the main body 1 and corresponds to the position of the dumpster module 3. The compressing unit 27 is used to compress the waste, which will be transported to enhance the space efficiency. At final, the main control unit 21 is electrically connected to the wireless receiving unit 28. In the present embodiment, the wireless receiving unit 28 is a wireless module for sending and receiving wireless signals so as to facilitate remote control to send control signals or remote monitoring the recycling system.

Figure 3:
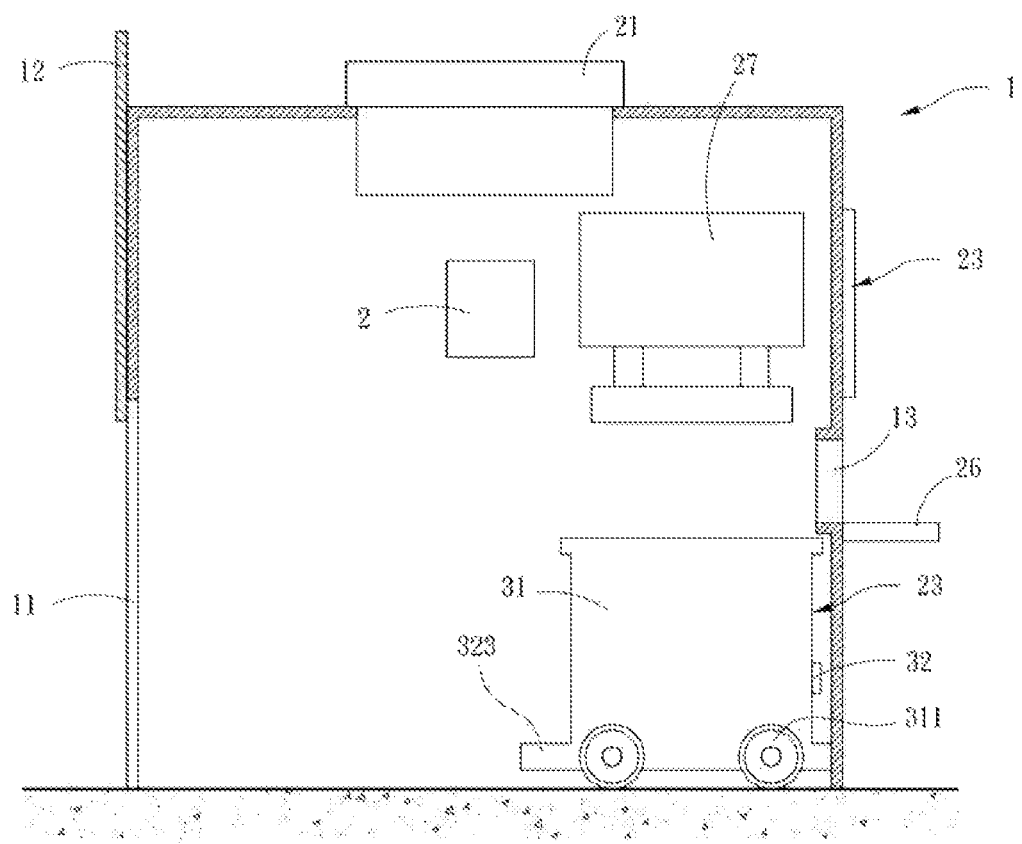
FIG. 3 is a sectional view of the structure in the present invention.
Figure 4:
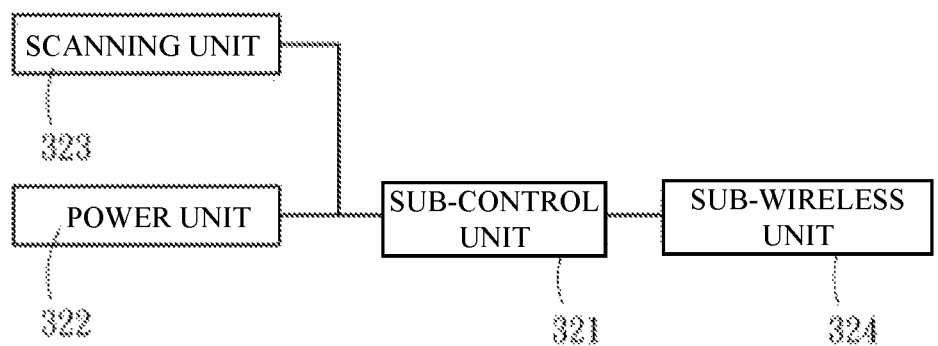
FIG. 4 is a system block diagram of a sub-control module in the present invention.

Still to referring to FIG. 1, the dumpster module 3 is electrically connected to the main control module 2, and the dumpster module 3 further includes a dumpster 31 and a sub-control module 32. The dumpster 31 has a hollow rectangular body, and includes a plurality of roller 311 for the dumpster 31 to have a moving function. The dumpster 31 is accommodated inside the main body 1 and positioned just below the compressing unit 27. FIG. 3 is a cross-sectional view of a structure of the recycling system. As shown in FIG. 3, the dumpster 31 is close to the input port 13 so that the recycling materials fall into the interior of the dumpster 31 after being dropped from the input port 13. FIG. 4 is a system diagram of the sub-control module. With reference to FIG. 4, the sub-control module 32 further includes a sub-control unit 321. The sub-control unit 321 is a function control center of the dumpster module 3 and is a control computer for transmitting or receiving the control commands and feedback of the dumpster module 3. The sub-control unit 321 is electrically connected to the main control unit 21. The sub-control unit 321 is further electrically connected to a power unit 322, and the power unit 322 is a power motor in the present embodiment and is used to connect the rollers 311 to provide power to drive the rollers 311 to rotate so as to move the dumpster 31. The sub-control unit 321 is electrically connected to a scanning unit 323. The scanning unit 323 is a scanning device and is located at the front end of the dumpster 31. The scanning unit 323 is used to receive signals, and transmits the signal to the sub-control unit 321. The sub-control unit 321 is electrically connected to a sub-wireless unit 324. The sub-control unit 321 is a wireless module in the present embodiment, and transmits and receives wireless signals in cooperated with the main control unit 21 so as to receive control commands.

Figure 5:
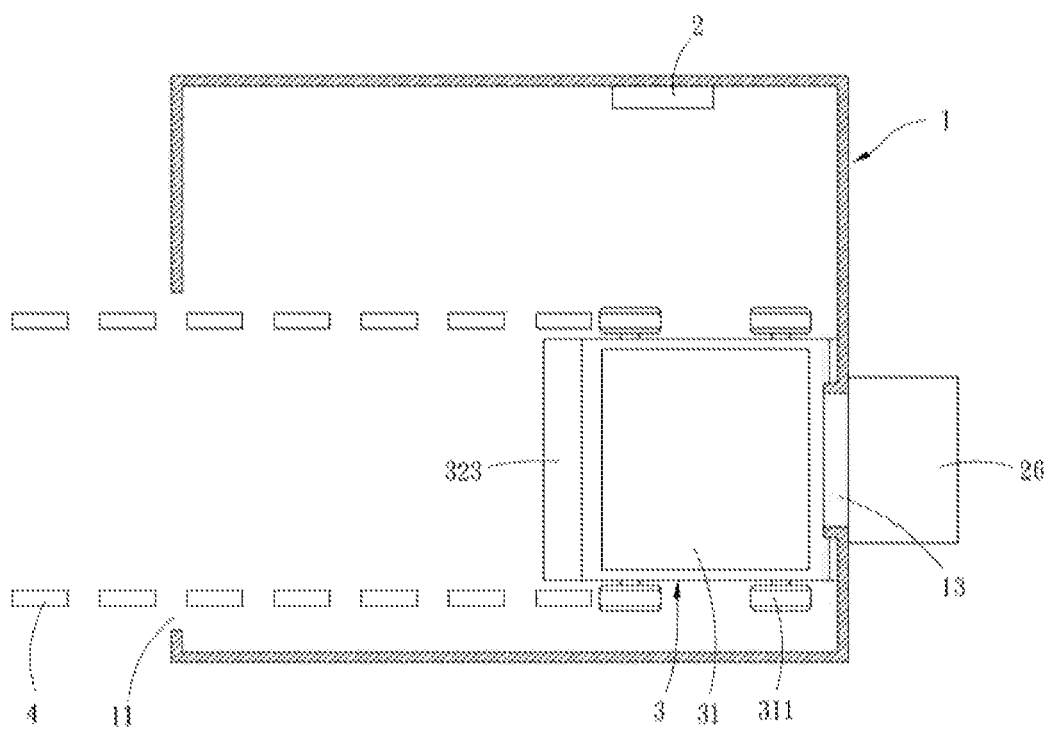
FIG. 5 is a top view of the structure in the present invention.

Please referring to FIG. 5, and it is a top view of the structure in the present invention. The recycling system in the present invention further includes a plurality of guiding units 4. In the present embodiment, the guiding units 4 may be signal transmitters or inductive tags for providing signals. The guiding units 4 are disposed on the transportation path of the dumpster 31. By sensing through the scanning unit 323 on the dumpster 31, and the scanned signal is transmitted to the sub-control unit 321 to control the dumpster 31 to operate automatically; Therefore, the recycling system can be controlled by the transporting schedule of the back-end system. Before the cleaning truck reaches the predetermined recycling position, the back-end system sends the wireless signal to each recycling system, and then through the main control module 2, the main control unit 21 sends a control signal to the dumpster module 3. Then the sub-control unit 321 controls the dumpster 31 to automatically run along the guiding units 4 to a predetermined position according to the control command in the control signal and waits for the recycling vehicle to collect the recycling materials on the dumpster 31. In addition, the compressing unit 27 disposed inside the main body 1 detects the capacity of the dumpster 31 by the action of compression. If the dumpster 31 has reached the critical capacity and the compression cannot be continued, the compressing unit 27 reports back to the main control unit 21. And then the main control unit 21 reports back to the back-end system, so that the system can arrange a transporting schedule.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A waste recycling system with an automated dumpster comprising:
    a main body including:
        an opening disposed at a first side of the main body;
        a movable door panel disposed at a position corresponding to the opening; and used to cover the opening; and
        an input port disposed at a second side of the main body, and the first side is opposite to the second side;
    a main control module disposed within the main body and used to control all functions of the recycling system, and the main control module further including:
        a main control unit used to send or receive commands and feedbacks of all control functions;
        an input unit electrically connected to the main control unit and disposed at the second side of the main body to display system-related information, and is operated by touch action and transmits input-related information to the main control unit;
        a payment flow unit electrically connected to the main control unit, and the payment flow unit disposed on the second side of the main body and adjacent to the input unit;
        a weighing unit electrically connected to the main control unit for weighing weight of recycling materials and transmitting weighing information to the main control unit, and the weighing unit disposed at the second side of the main body, and a position of the weighing unit corresponding to the input port of the main body, wherein the weighing unit has a flat shape and can be folded, so that the input port can be sealed when the weighing unit is not in use; and
        a wireless receiving unit electrically connected to the main control unit for sending and receiving wireless signals so as to return the wireless signal to the main control unit; and
    a dumpster module electrically connected to the main control module, and including:
        a dumpster having a plurality of rollers disposed at bottom of the dumpster, accommodated inside the main body and close to the input port; and
        a sub-control module disposed on the dumpster and including:
            a sub-control unit, which is a function control center of the dumpster module, used to transmit or receive control commands and feedback of the dumpster module and electrically connected to the main control unit;
            a power unit electrically connected to the sub-control unit, and used to connect the plurality of rollers to provide power to drive the plurality of rollers to rotate;
            a scanning unit electrically connected to the sub-control unit and disposed at a front end of the dumpster, and used for receiving signals and transmitting to the sub-control unit;
            a sub-wireless unit electrically connected to the sub-control unit to send and receive the wireless signals cooperated with the main control unit to receive control commands; and
        a plurality of guiding units disposed on a transporting path of the dumpster and straightly extending outside the main body along a direction from the second side to the first side, wherein the scanning unit on the dumpster is scanning and reporting scanned signal to the sub-control unit to control the dumpster operating automatically.

2. The waste recycling system of claim 1, wherein the main control unit is electrically connected to a refrigeration unit, and the refrigeration unit is located on top of the main body to reduce temperature inside the main body.

3. The waste recycling system of claim 1, wherein the input unit is a display touch panel.

4. The waste recycling system of claim 1, wherein the payment flow unit is a scanning device for accepting any payment instrument.

5. The waste recycling system of claim 1, wherein the payment flow unit is a coin machine.

6. The waste recycling system of claim 1, wherein the input unit is provided with an audio playing unit for playing related audio description or prompt sound.

7. The waste recycling system of claim 1, wherein the main control unit is electrically connected to a sensing unit, and the sensing unit is used to identify user's identity.

8. The waste recycling system of claim 1, wherein the weighing unit is an electronic scale.

9. The waste recycling system of claim 1, wherein the main control unit is electrically connected to a compressing unit, and the compressing unit is located inside the main body and corresponds to the position of the dumpster.

10. The waste recycling system of claim 1, wherein the power unit is a power motor.

11. The waste recycling system of claim 1, wherein the guiding units are signal transmitters.

12. The waste recycling system of claim 1, wherein the guiding units are inductive tags for providing signals.

* * * * *